United States Patent
Sladek et al.

(10) Patent No.: US 7,043,241 B1
(45) Date of Patent: May 9, 2006

(54) METHOD AND SYSTEM FOR PROVISIONING AUTHORIZATION FOR USE OF A SERVICE IN A COMMUNICATIONS NETWORK

(75) Inventors: Thomas M. Sladek, Overland Park, KS (US); Charles Woodson, Peculiar, MO (US); Alex Zhang, Overland Park, KS (US); Debashis Haldar, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 444 days.

(21) Appl. No.: 10/294,538

(22) Filed: Nov. 14, 2002

Related U.S. Application Data

(63) Continuation-in-part of application No. 09/411,878, filed on Oct. 4, 1999, now Pat. No. 6,622,016.

(51) Int. Cl.
*H04Q 7/20* (2006.01)

(52) U.S. Cl. ............... 455/432.3; 455/433; 455/435.1; 455/435.2; 379/201.01

(58) Field of Classification Search ................ 455/433, 455/432.3, 435.1, 435.2; 379/201.01
See application file for complete search history.

(56) References Cited

U.S. PATENT DOCUMENTS

| | | | |
|---|---|---|---|
| 5,548,636 A * | 8/1996 | Bannister et al. ...... | 379/390.01 |
| 5,568,153 A * | 10/1996 | Beliveau .................. | 342/357.1 |
| 5,610,969 A | 3/1997 | McHenry et al. | |
| 5,629,978 A * | 5/1997 | Blumhardt et al. ......... | 370/271 |
| 5,657,451 A * | 8/1997 | Khello .................. | 379/201.03 |
| 5,758,281 A | 5/1998 | Emery et al. | |
| 5,845,207 A | 12/1998 | Amin et al. | |
| 5,913,165 A * | 6/1999 | Foti ........................ | 455/435.3 |
| 5,920,820 A * | 7/1999 | Qureshi et al. ............. | 455/461 |
| 5,933,778 A | 8/1999 | Buhrmann et al. | |
| 6,119,001 A * | 9/2000 | Delis et al. .................. | 455/433 |
| 6,167,250 A * | 12/2000 | Rahman et al. ............. | 455/406 |
| 6,295,291 B1 * | 9/2001 | Larkins ...................... | 370/352 |
| 6,584,312 B1 * | 6/2003 | Morin et al. ................. | 455/433 |

* cited by examiner

*Primary Examiner*—Stephen D'Agosta

(57) ABSTRACT

A method and system for provisioning authorization for use of a service in a communications network. In response to a dialed feature code by a subscriber, a network entity may modify the subscriber's profile maintained by a serving system to authorize use of a service by the subscriber as indicated by the feature code. Alternatively, the subscriber's profile may be modified to prohibit use of the service as instructed by the dialed feature code. Therefore, the subscriber may effectively subscribe to or unsubscribe from a service in this manner by dialing a feature code.

23 Claims, 5 Drawing Sheets

METHOD AND SYSTEM FOR PROVISIONING AUTHORIZATION FOR USE OF A SERVICE IN A COMMUNICATIONS NETWORK

CROSS-REFERENCE TO RELATED APPLICATIONS

The present patent application is a continuation-in-part application of U.S. patent application Ser. No. 09/411,878, filed on Oct. 4, 1999 now U.S. Pat. No. 6,622,016, the full disclosure of which is incorporated herein by reference.

FIELD OF INVENTION

The present invention is related to communications networks and, more particularly, to provisioning of services in such a network.

BACKGROUND

Recent advances in communication systems have enabled a wide array of special services available to subscribers. Examples of such services include abbreviated dialing, which allows a subscriber to reach a party by dialing less than the entire telephone number of that party, call forwarding, in which calls directed to the subscriber may be forwarded to another line, terminating call screening, which allows the subscriber to specify certain time during which incoming calls are to be rejected, and originating call screening, in which calls to certain telephone numbers are barred. In general, special communications services encompass those call features that do more than simply place or terminate telephone calls as dialed.

In the past, switches or other entities of a communication (or telecommunication) network that route calls from one location to another governed and provided special telecommunications services. Such switches or other entities are usually at least part of a "serving system" that provides service for multiple subscribers (typically in a given area).

Many telecommunications networks have adopted an advanced intelligent network (AIN) approach (or simply intelligent network (IN)) to implement a serving system, that may govern and provide such special telecommunications services. (An IN network is a telecommunications network architecture that separates service logic from switching equipment, allowing new services to be added without having to redesign switches to support the new services.) According to IN, control information and call processing logic reside in a central network location or a central control point. Switches within the telecommunication network are programmed with a relatively minimal set of service logic that causes the switch to query the central control point at predefined "trigger points" during call processing, providing the central control point with parameters such as an identification of the calling and called parties, for example. When the central control point receives the query message, it may execute an appropriate set of service logic or consult appropriate databases in order to obtain information and instructions needed to provide a special service to the call. In turn, the central control point may return a response message to the switch, instructing the switch how to handle the call. In general, the trigger points and other control information and parameters about call processing for a given subscriber or group of subscribers can be defined and recorded in a database that is maintained for reference by the serving system during call processing. This set of parameters is considered a type of profile for the given subscriber, or a "subscriber profile." When the switch receives a request to complete a call to or from a subscriber, the switch may consult the subscriber's profile to determine whether it needs to query a central control point for call-handling instructions and/or whether it should carry out certain call processing logic itself.

A subscriber profile may define various types of trigger points and control information. For example, a profile may define an "all-digits trigger," which instructs the network to query the central control point whenever the serving system receives a call origination attempt from the subscriber. Similarly, a profile may define a "termination-attempt trigger," which informs the network to query the central control point whenever the serving system receives a request to connect a call to the subscriber. Such triggers can be usefully employed to give the central control point control over the services that will be provided to the subscriber. Other triggers are available as well.

An IN system typically employs a standardized set of messages for communication between the switches and the central control point, in order to allow for a variety of services and triggers within call-processing to be utilized. This standardized set of messages may be To conveyed over an out-of-band common channel interoffice signaling (CCIS) network, according to an established signaling protocol, such as signaling system #7 (SS7). According to SS7, predefined messages may be coded as transaction capabilities application part (TCAP) messages and routed via signaling transfer points (STP) between the switches and the central control point.

An IN system may be employed within a landline or a wireless telecommunications network. In a landline IN arrangement, each serving system includes a switch referred to as a service switching point (SSP). The SSP is coupled via an STP network to a central control point, which is referred to as a service control point (SCP). The SSP includes a subscriber profile database, which defines trigger points for a given subscriber. The SCP includes a subscriber profile database as well, indicating what service logic to provide for a particular subscriber. When the SSP encounters a trigger point during call processing, it generates a TCAP query message defining the subscriber and other parameters, and it sends the query message to the SCP. The SCP may then reference its subscriber profile database and identify and execute the appropriate set of service logic. The SCP then generates and sends a TCAP response message to the SSP providing call handling instructions.

In a wireless IN arrangement (i.e., wireless intelligent network (WIN)), each serving system includes a switch often referred to as a mobile switching center (MSC) and the system includes an SCP as well. The serving system also includes a home location register (HLR) (in addition to or rather than an SCP) that defines the services and features authorized for use by the subscriber. A mobile subscriber communicates with the MSC through a base station, which provides an air interface for the mobile subscriber. The MSC connects to the HLR and the SCP through an STP network in order to access information about the subscriber. When a mobile subscriber operates in a given serving system, the serving system engages in signaling communication with the HLR in the subscriber's home system to notify the HLR where the subscriber is located and to obtain the subscriber's current profile. The serving system may also include a subscriber profile database referred to as a visitor location register (VLR), which stores a temporary copy of a subscriber's profile obtained from the HLR. The MSC may also access the VLR to obtain information about the subscriber.

The IN arrangement typically also includes a service management system (SMS) that stores a backup of the subscriber's profile. The SMS couples to the SCP or the HLR within the arrangement. The IN serving system arrangement may further include an integrated service control point (ISCP), which may function similar to an SCP. Furthermore, the IN system may include an advanced service management system (ASMS), which functions similar to the SMS.

The ISCP and ASMS may be included in the IN system in addition to or rather than the SCP and SMS within the system.

In a typical IN arrangement, many of the services for which a subscriber is authorized (i.e., to which the subscriber subscribes) can be turned on and off (activated or deactivated) or modified. For example, a subscriber may subscribe to a call-forwarding service, which provides that an unanswered call should be forwarded to a designated network address. And the subscriber may then be given the ability to turn this service on or off. The subscriber may also be given the ability to set the telephone number to which the calls to the subscriber should be forwarded, or modify this telephone number as well.

To facilitate activating, deactivating, and modifying telecommunications services to which the subscriber subscribes, the industry has for many years employed a concept known as "feature codes." A service provider may define specific digit sequences for use in activating, deactivating, or modifying particular service features. Each sequence is known as a feature code or a feature code string. A feature code usually consists of an asterisk (*) followed by one or more numeric digits (0 through 9). For example, the feature code string

*72 3125559811 could mean that a call forwarding "forward-to" number is being set. In this example, *72 indicates that the call-forwarding feature is being accessed, and the digit sequence 3125559811 indicates the forward-to number. In some instances, a feature code may be sent to activate, deactivate, or modify a service feature generally for all calls. Other feature codes can be applied on a per-call basis.

When a subscriber sends a feature code to a serving system, the serving system may respond to the feature code by employing logic to activate, deactivate, or modify a service feature for the subscriber. The serving system may also, or alternatively, forward the feature code and other dialed digits to a central control point, which may responsively activate, deactivate, or modify a service feature for the subscriber.

To activate, deactivate, or modify a service, a subscriber must be authorized to use the service. A subscriber can obtain authorization by requesting that the service be added to his/her subscriber profile. As such, a subscriber cannot activate a service that is not within his/her subscriber profile, because the subscriber only has authorization to use services within his/her profile (i.e., services to which the subscriber has subscribed).

With advances in communications, the industry has recognized an increasing importance of providing new services for subscribers, such as those that can be activated using feature codes. Currently, for a subscriber to subscribe to a new service and be authorized to activate, deactivate, or modify the new service, the subscriber must contact a customer care center managed by the subscriber's service provider. Upon contacting the customer care center, the subscriber can then inform a customer care agent (i.e., an individual working at the customer care center) of the services that the subscriber wants to add to his/her subscription. The customer care agent may is then create a new record in the subscriber's profile (or modify an existing record in the subscriber's profile) in order to add the new services for the subscriber. The new record is typically reflected in the subscriber's profile within one business day.

The subscriber must contact the customer care center whenever he/she desires to subscribe to or unsubscribe from services (contrasted with merely activating, deactivating, or changing an operational parameter of a service to which the subscriber already subscribes). This can become a burdensome and an inefficient manner of providing subscription services. In addition, when subscribing to or unsubscribing from services, the subscriber may have to wait for the customer care center (and the back-end provisioning system) to update the subscriber's profile in order for the changes to take effect.

SUMMARY

The present invention provides a method and system for controlling provisioning of communications services. The method may be performed in a communications network comprising an entity that maintains a subscriber profile for at least one subscriber. In one aspect, the method includes receiving a message from a communications device operated by the at least one subscriber. The message indicates a service provided by the communications network. The method further includes, based on the message, responsively provisioning the subscriber profile to indicate that the subscriber is entitled to invoke the service or responsively provisioning the subscriber profile to indicate that the subscriber is not entitled to invoke the service. In another respect, the invention may take the form of a system for provisioning a subscriber profile to indicate authorization for use of a service by the at least one subscriber. The system may include a switch that is operable to receive a message from a telecommunications device operated by the at least one subscriber. The system may also include a central control point coupled to the switch. The central control point may receive the message from the switch and determine that the message contains a feature code, which indicates the service for which the subscriber either desires to receive permission to use or desires to no longer have permission to use. The central control point may send a request message comprising the feature code to at least one network entity and, based on the feature code, the request message may cause logic within the at least one network entity to provision the subscriber profile to include authorization for use of the service by the at least one subscriber or to provision the subscriber profile to indicate that the subscriber is not entitled to invoke the service.

In still another respect, the invention may take the form of method of authorizing use of a service by at least one subscriber. The method may be performed in a telecommunications network comprising an entity that maintains a subscriber profile for at least one subscriber, in which the subscriber profile defines a trigger point during call processing. The method may include receiving a feature code from a telecommunications device operated by the at least one subscriber. The feature code indicates a service of the serving system. The method may then include, based on the feature code, establishing a trigger point in the subscriber profile in at least one entity of the serving system, to cause the at least one entity to execute an appropriate set of service logic in order to perform the service indicated by the feature code upon request by the at least one subscriber, such as after the subscriber activates the service.

In an alternative embodiment, the invention may take the form of a method of prohibiting use of a service by at least one subscriber. The method may include receiving a feature code from a telecommunications device operated by the at least one subscriber and, based on the feature code, removing from the subscriber profile in at least one entity of the serving system a trigger point which would have caused the at least one entity to execute an appropriate set of service logic in order to perform the service indicated by the feature code upon request by the at least one subscriber.

The present invention can be applied in various network arrangements where a subscriber profile is employed by a serving system, whether the profile is wholly or partially maintained in the serving system or elsewhere. Thus, for instance, the invention is applicable in a landline IN arrangement where an SSP applies a subscriber profile and may thereby encounter a trigger that causes the SSP to query an SCP for guidance. As another example, the invention is applicable in a wireless IN arrangement where an MSC applies a subscriber profile defined by a VLR (and/or maintained at least in part by an HLR (e.g., in the case of an advanced-termination trigger)) and may thereby encounter a trigger that causes the MSC to query an SCP or HLR for guidance. As still another example, the invention is applicable in a next generation packet-switched network, in which (for instance) a call agent or other serving system entity may apply a subscriber profile and responsively query an application server for guidance. Of course, other examples are possible as well.

These as well as other features and advantages will become apparent to those of ordinary skill in the art by reading the following detailed description, with appropriate reference to the accompanying drawings.

BRIEF DESCRIPTION OF FIGURES

Exemplary embodiments of the present invention are described herein with reference to the drawings, in which.

DETAILED DESCRIPTION OF EXEMPLARY EMBODIMENTS

Figure 1:
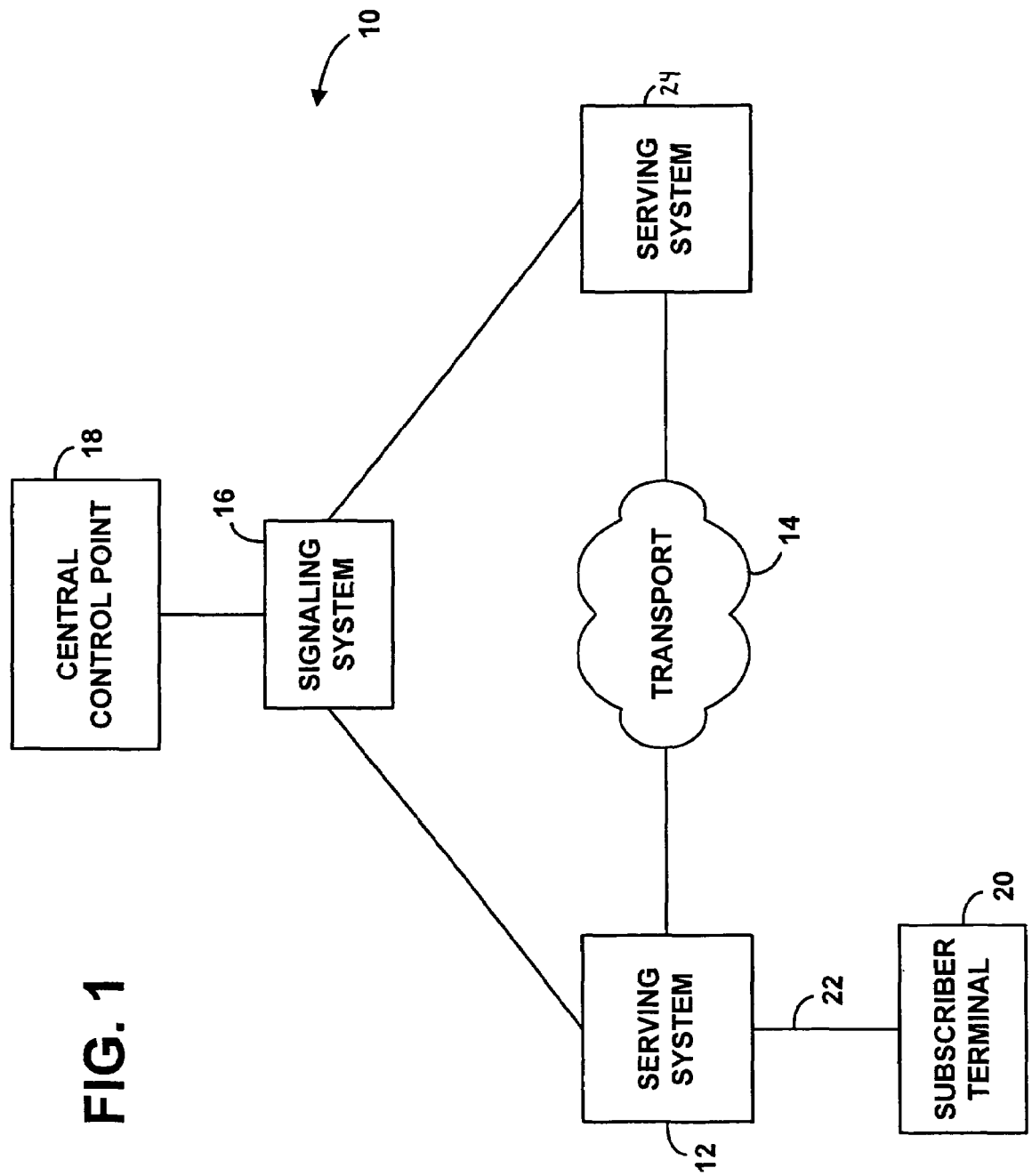
FIG. 1 is a simplified block diagram illustrating a telecommunications network comprising a serving system and a central control point, in which an exemplary embodiment of the present invention can be implemented.
Figure 2:
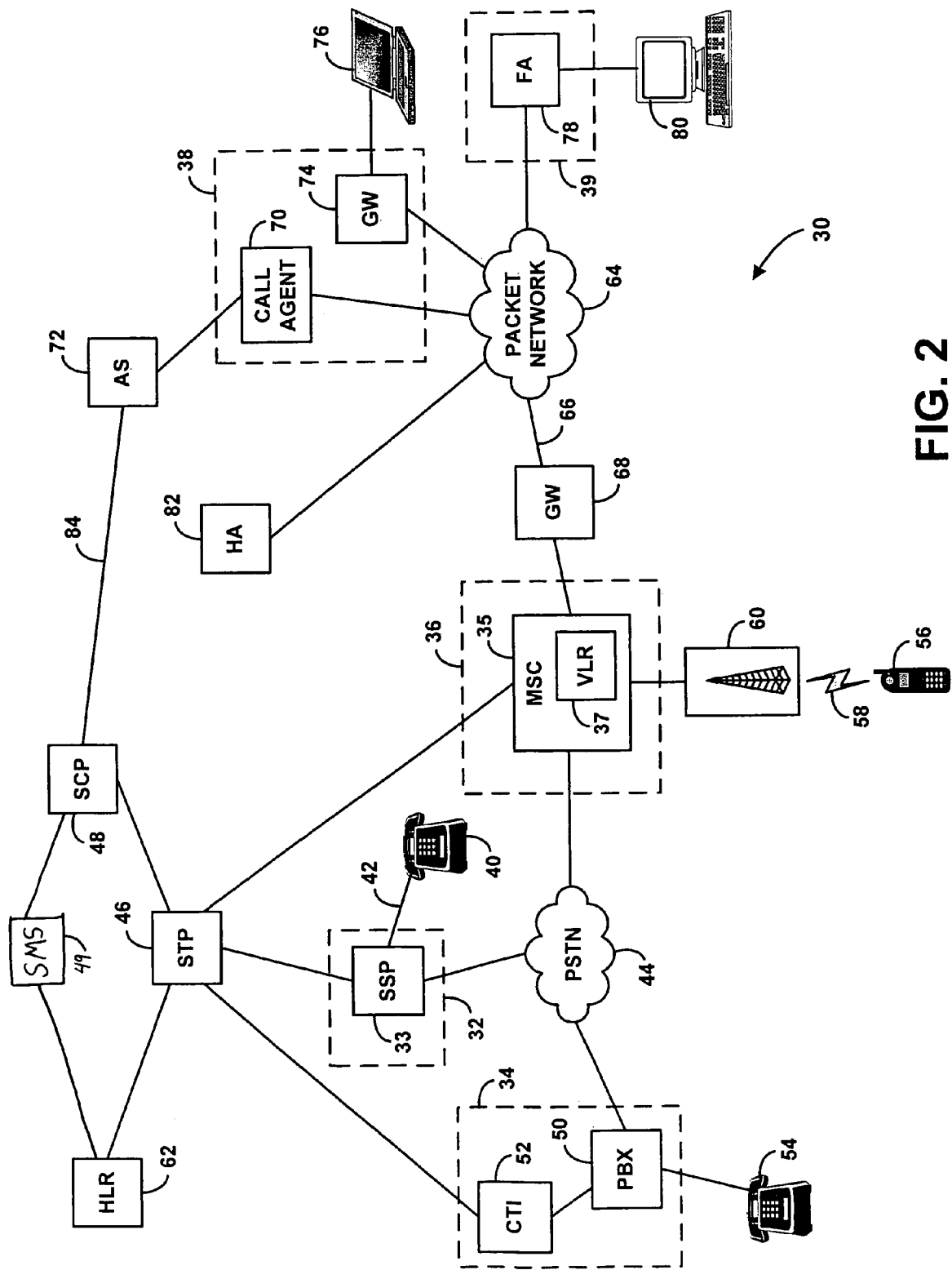
FIG. 2 is a block diagram illustrating a telecommunications network comprising a plurality of serving systems and central control points, in which an exemplary embodiment of the present invention can be implemented.
Figure 3:
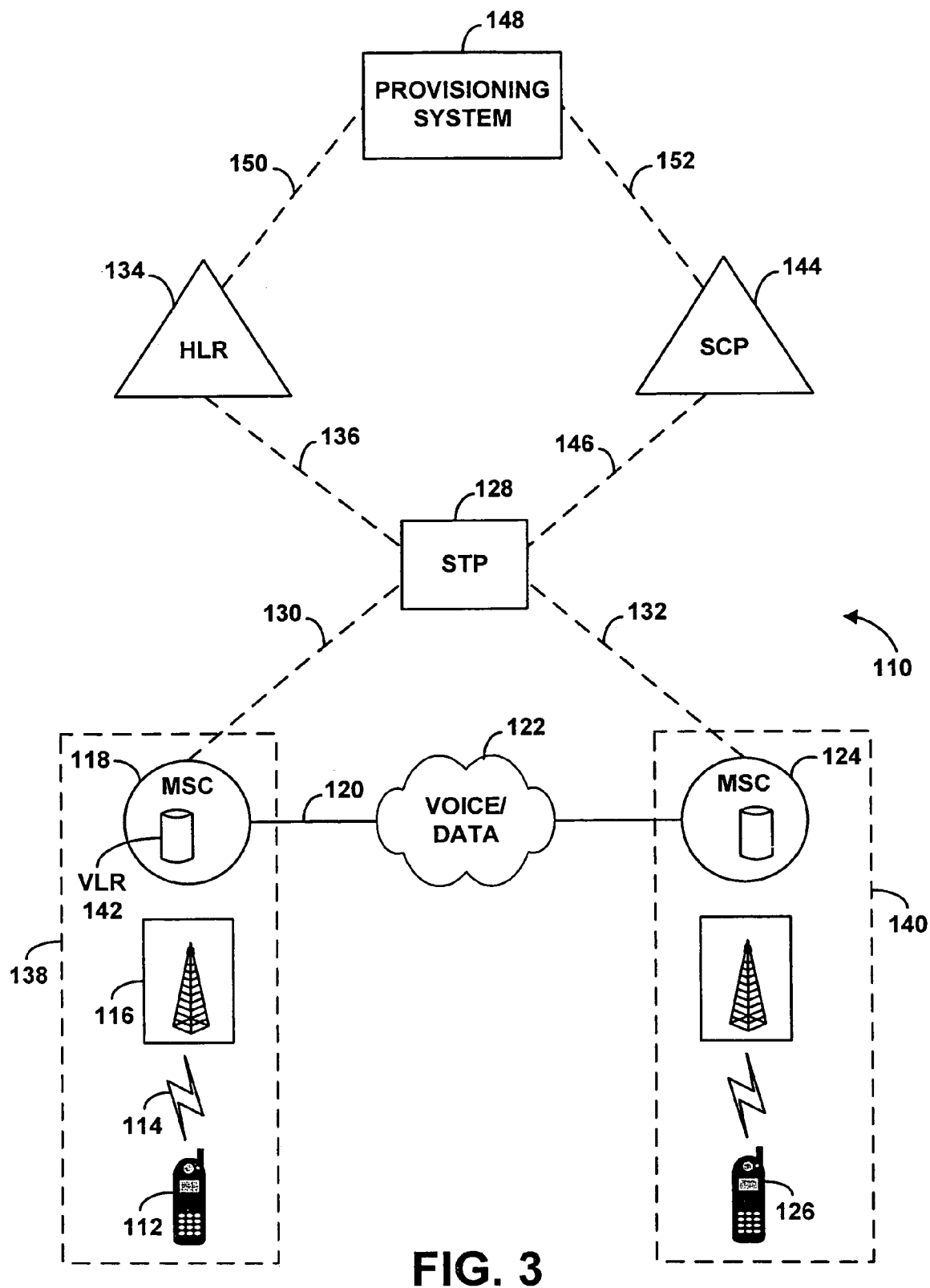
FIG. 3 is a block diagram illustrating a wireless network arrangement in which an exemplary embodiment of the present invention can be implemented.

According to an exemplary embodiment, a user of a telecommunications device may subscribe to or unsubscribe from a service by dialing a feature code. FIGS. 1–3 illustrate network communication arrangements in which the user may operate the device to subscribe to or unsubscribe from a service.

Referring to FIGS. 1, a simplified block diagram of a telecommunications network 10 in which an exemplary embodiment of the present invention can be employed is illustrated. As shown in FIG. 1, network 10 includes a serving system 12 interconnected to (or part of) a transport network 14 and to a signaling system 16, and at least one central control point (CCP) 18 interconnected to the signaling system 16 as well. Network 10 further includes a plurality of subscriber terminals, of which exemplary terminal 20 is shown. Terminal 20 may take any suitable form, such as (without limitation) a telephone, a computer, or a personal digital assistant (PDA). Terminal 20 may then be coupled to serving system 16 by an appropriate link 22, which may comprise wireline or wireless portions. Network 10 further includes an additional serving system 24 interconnected to the transport network 14 as well to allow the terminal 20 to communicate with other subscriber terminals located on other serving systems.

This and other arrangements described herein are shown for purposes of illustration only, and those skilled in the art will appreciate that other arrangements and other elements (e.g., machines, interfaces, functions, orders of functions, etc.) can be used instead, and some elements may be omitted altogether. Further, as in most telecommunications applications, those skilled in the art will appreciate that many of the elements described herein are functional entities that may be implemented as discrete components or in conjunction with other components, in any suitable combination and location. Still further, various functions described herein as being performed by one or more entities may be carried out by a processor executing an appropriate set of machine language instructions stored in memory (and/or by hardware or firmware). Provided with the present disclosure, those skilled in the art can readily prepare appropriate computer instructions to perform such functions.

Serving system 12 includes a set of stored logic that defines how to process calls involving one or more terminals, such as terminal 20. The stored logic may include a number of trigger points that cause the serving system to seek guidance from CCP 18 in response to various conditions. When serving system 12 encounters a trigger, the serving system 12 may pause call processing and send a signaling message via signaling system 16 to CCP 18, carrying various parameters. For calls originating from terminal 20, the signaling message may, for instance, convey an identification of the terminal and the digit sequence dialed by the subscriber. For calls terminating to terminal 20, the signaling message may, for instance, convey an identification of the terminal and an indication of the calling party. Of course, these are only examples; the messages may convey these and/or other parameters.

As further noted, CCP 18 also includes a set of stored logic. When CCP 18 receives the signaling message from serving system 12, CCP 18 will execute its stored logic to parse the message, identify its parameters, and responsively carry out one or more functions. For example, in response to a call-origination signaling message, CCP 18 may determine that the subscriber dialed a toll-free number (e.g., an 800, 888 or 877 number). Conventionally, the CCP's logic may then cause the CCP 18 to reference a database in order to translate the toll-free number into an actual routing number associated with the called party. The CCP 18 may then generate and send to serving system 12 a response message instructing serving system 12 to route the call to the actual routing number. In turn, serving system 12 would then set up and connect the call over transport network 14 to that routing number.

Network 10 is generically representative of an IN arrangement in which an exemplary embodiment of the present invention can be implemented. The particular arrangement, however, may take any of a variety of forms. To further illustrate arrangements in which the invention can be implemented, FIG. 2 depicts a network 30, which comprises at least five example serving systems, designated respectively by reference numerals 32, 34, 36, 38 and 39, through which the present invention may be performed.

Example serving system 32 is principally a landline serving system, which typically comprises a landline switch (e.g., SSP 33), such as a Nortel DMS-250. Serving system 32 serves a plurality of landline subscriber stations, of which an exemplary station 40 is shown coupled by link 42 (typically a twisted copper pair of wires), and the SSP 33 includes a set of logic indicating how to process calls involving those stations. Serving system 32 is coupled to a transport network such as the public switched telephone network (PSTN) 44, and further to a signaling system represented by STP 46. In turn, STP 46 is coupled to a central control point such as SCP 48, which may also connect to SMS 49. SCP 48 includes a set of service logic to perform IN functions for calls being served by serving system 32. When serving system 32 encounters a predefined trigger point in its service logic, it pauses call processing and sends a signaling message via STP 46 to SCP 48. SCP 48 interprets the message and applies its own service logic, and SCP 48 then typically returns a response signaling message via STP 46 to serving system 32, instructing serving system 32 how to handle the call. In some instances, SCP 48 may also send a message to SMS 49 causing SMS 49 to update its subscriber database according to the manner that the call is handled.

Example serving system 34 comprises a private branch exchange (PBX) server 50 coupled to a computer telephony interface (CTI) 52. Such a serving system may serve a plurality of subscriber stations (e.g., corporate telephones or the like), an exemplary one of which is shown as station 54 for instance. The serving system 34 (typically CTI 52) may maintain one or more subscriber profiles that define service parameters for the various stations being served. When the serving system 34 receives a call to or from station 54, the CTI 52 may then apply a set of logic based on the associated subscriber profile and, in doing so, may encounter a trigger point that causes the CTI 52 to query SCP 48 for guidance. The CTI 52 might then pause processing and send a signaling message via STP 46 to SCP 48, and the SCP 48 might then apply its own service logic and send a response message to the CTI 52 instructing system 34 how to handle the call.

Example serving system 36 is principally a wireless serving system, which typically comprises an MSC 35, such as a Lucent or Nortel MSC. Serving system 36 serves a plurality of wireless subscriber stations, of which an exemplary station 56 is shown coupled via an air interface 58 and base station 60. Serving system 36 further typically includes a VLR 37, which maintains service logic (e.g., profiles) for wireless stations currently being served by system 36. Serving system 36 is also coupled via STP 46 to a HLR 62, which, in this example, serves as the home register for wireless station 56. HLR 62 may perform IN functions for calls being served by serving system 36. For instance, when serving system 36 receives a call for station 56 and station 56 is busy, serving system 36 may encounter a trigger, responsively pause processing and send a signaling message via STP 46 to HLR 62. HLR 62 would then interpret the message and apply its own service logic, and HLR 62 would then return a response signaling message via STP 46 to serving system 36, instructing serving system 36 how to handle the call. In addition, SCP 48 may perform IN functions for serving system 36 in a similar fashion.

Traditional landline and wireless communication networks have been based principally on a circuit-switched arrangement, in which a switch (e.g., SSP or MSC) sets up and reserves an actual circuit with a remote switch, maintaining the circuit for the duration of the call.

Recognizing the inherent inefficiency of this arrangement, the telecommunications industry has begun to embrace various "next generation networks" instead. Such networks typically employ packet-switched communication links (in addition to or instead of circuit-switched links). A gateway or "network access server" typically receives a media stream (e.g., voice, video, etc.) and/or a pure data stream and encodes and packetizes the stream into a sequence of packets.

Each packet bears a header identifying its source and destination address as well as other information. The packets may be routed independently from node to node through a network and then re-ordered and reassembled by a gateway at the destination end for output to a receiving entity (e.g., person or machine). Alternatively, the packets may follow an established "virtual circuit," each traversing the same path from node to node and ultimately to the destination gateway.

Network 30 may employ these next generation network techniques. For purposes of illustration, example serving system 36 is shown coupled to two transport networks, PSTN 44 and a packet-switched network 64 (such as the Internet, for instance). Serving system 36 may be coupled to the packet network 64 by a link 66 that includes an "interworking function" (IWF) or gateway 68, which is arranged to convert between circuit-switched voice and/or data transmissions handled by system 36 and a packet sequence appropriate for transport over network 64. In this way, serving system 36 can provide connectivity for wireless subscriber station 56 over both the PSTN 44 and the packet-switched network 64. Alternatively, in a "3G" or later arrangement, information could pass as packet data more directly between station 56 and network 64, via a packet data serving node (PDSN) (not shown).

Next generation networks may employ IN principles as well. For example, and without limitation, a network access server may communicate with a "call agent" node on the packet-switched network. The call agent node may serve as a gatekeeper, typically including connection manager, connection performer, and service management layers for routing calls through the packet network. (The call agent node may also be referred to as a "service manager," or "soft switch.") To take advantage of existing architecture, the service logic for providing IN telecommunications services then typically resides on a separate "application server" also coupled with the packet-switched network or coupled directly with the call agent node. (The application server may itself be an SCP, for instance). The call agent and gateway may cooperatively be considered a type of "serving system" for a media stream and/or data stream being transmitted in a packet switched network, and the application server may be considered a type of central control point. As in traditional IN arrangements, the serving system may then query the central control point, providing parameters such as the source and destination addresses, and the central control point can execute appropriate service logic and return call handling instructions. For instance, the application server may direct the serving system to redirect the packet stream to a "forwarding" address or other location.

Example serving system 38 illustrates such an IN next generation network. Serving system 38 comprises a call agent node 70 (e.g., a Telcordia Service Manager or a Lucent 5E), which is coupled to (or a node on) packet network 64. Call agent node 70 is in turn coupled to an application server (AS) node 72, which may itself be an application residing on an SCP, HLR, CTI or similar entity. (For instance, as presently contemplated, AS 72 and SCP 48 may be provided as a common entity). Alternatively, both the call agent node and the AS node might be independent nodes on packet network 64. Serving system 38 may further comprise a gateway (GW) or other such node (e.g., switch, hub, router, etc.), which may seek to route packets representing real-time media (e.g., voice, video, etc.) and/or data streams over the packet network. An example of such a gateway node is shown in FIG. 2 as gateway (GW) 74. GW 74 may provide subscriber stations with connectivity to the packet network. A representative station is shown as station 76.

Call agent node 70 may maintain a set of subscriber profile logic, including parameters such as trigger points, for subscribers such as station 76. When GW 74 or another node seeks to route a packet sequence to or from station 76, the node may then communicate with call agent 70 (e.g., via known protocol such as media gateway control protocol-MGCP, simple gateway control protocol-SGCP, session initiation protocol-SIP or H.323) to obtain call handling instructions. Call agent 70 may in turn encounter a trigger point in the subscriber profile and responsively communicate with AS 72 to obtain IN service. In practice, call agent 70 may communicate with AS 72 according to the IN 0.2 protocol, over TCP/IP, or according to any other suitable protocol (e.g., SIP, H.323 or straight SS7). Thus, call agent 70 may generate and send to AS 72 a TCAP query message defining various parameters, and AS 72 may responsively employ an appropriate set of service logic and then generate and send to call agent 70 a TCAP response message. Call agent 70 may then instruct gateway 74 accordingly. In this arrangement, the CCP thus comprises AS 72. From another perspective, however, the CCP may be considered to include call agent 70, for instance, to the extent the call agent 70 also provides AIN or IN service logic to assist the gateway in handling call traffic.

Example serving system 39 also illustrates a type of next generation, packet-switched network arrangement. This arrangement, known as "Mobile IP," has emerged to serve nomadic users (terminals) who connect to a wireline (or possibly wireless) network. Mobile IP (MIP) attempts to solve a problem that arises when a mobile terminal with a permanent network address (e.g., internet protocol (IP) address) in one sub-network changes physical locations, such as moving to another sub-network. The arrangement works somewhat like a postal forwarding system. Each terminal is assigned a permanent address that is maintained by a "home agent," which might be a gateway or other entity in the terminal's home sub-network. When the terminal travels to another sub-network, the home agent will receive packets destined for the terminal. The home agent will then add a new header to the packets (or modify their existing headers) and forward them to a "foreign agent," which is a node serving the foreign sub-network. The foreign agent then de-capsulates the packets and forwards them to the mobile terminal.

As presently contemplated, IN principles can be applied in a Mobile IP arrangement as well. In particular, the sub-network in which the mobile terminal is currently located could be considered a serving system, and the terminal's home sub-network could be considered the terminal's home system. Thus, as presently contemplated, a subscriber's home agent can be programmed to serve as a central control point, somewhat like an HLR or SCP in a wireless network, and the foreign agent can be programmed to employ subscriber profiles for visiting terminals, somewhat like the combined MSC/VLR entity in a wireless network.

In FIG. 2, example serving system 39 is thus shown to comprise a MIP foreign agent (FA) 78. Typically, FA 78 might be a gateway node on packet network 64, arranged to convert between circuit-switched data and/or voice on one side and packet traffic appropriate for packet network 64 on the other side. However, FA 78 can take other forms. Then somewhat like serving system 36, serving system 39 would act as a serving system for nomadic stations (whether landline or wireless) that are visiting a given sub-network with which FA 78 is associated. One such station is depicted by way of example as station 80. In turn, packet network 64 is also coupled to (or includes) a home agent (HA) 82, which, in this example, serves as the home agent for station 80. As such, HA 82 may play the part of an IN central control point, maintaining a set of service logic and providing call handling instructions to serving system 39. The functionality of HA 82 may reside on an SCP or HLR, for instance.

As thus illustrated, each serving system in network 30 is typically served by one or more particular CCPs, which is usually (but not necessarily) owned and operated by the same carrier that operates the serving system. A CCP in one carrier's system, however, can be arranged to provide IN functionality to serve subscribers operating in another carrier's system. (Alternatively, one CCP in a given system can be arranged to provide IN functionality for another CCP in the same system). One way to accomplish this is to have the service logic in one carrier's CCP communicate with the service logic in another carrier's CCP, so that the other carrier's CCP can provide instructions on how to handle a call in the first carrier's serving system.

As shown in FIG. 2, for instance, SCP 48 might be coupled by a communications link 84 (which could be a packet switched link, for instance) with AS 72. That way, when a serving system on packet network 64 seeks guidance from AS 72, AS 72 can in turn seek guidance from SCP 46. In response to instructions from SCP 46, AS 72 can then pass a signaling message back to the querying serving system, instructing the system how to handle the call. Advantageously, then, a user engaging in communications over a next generation packet switched network can benefit from service logic maintained in another network, such as the user's home telephone network. For instance, the services and features that are applied to the user's home telephone can be applied as well to communications over the next generation network. The same thing can be said for other combinations of networks as well, such as mobile and landline, for instance.

Turning now to FIG. 3, there is shown more specifically a wireless network 110 in which an exemplary embodiment of the present invention can be implemented. As shown, network 110 includes a mobile station (MS) 112, which communicates over an air interface 114 (e.g., a $U_m$ interface as defined by IS-95) with a base station controller (BSC) 116. An intermediate base station (not shown) may be interposed between MS 112 and BSC 116. MS 112 may be any mobile station such as a cellular telephone, a PDA, a computer, a fax machine or other such device. In the example illustrated, MS 112 is a Code Division Multiple Access (CDMA) telephone that may support any one of IS-95 and GSM Intersystem Operation Standards (IOS) and may be identified by a unique tag such as a mobile station ID (MSID), electronic serial number (ESN), mobile directory number (MDN), or international mobile service ID (IMSI) for instance. BSC 116 may in turn be any base station controller arranged to communicate with MS 112, such as the Autoplex controller manufactured by Lucent Technologies.

BSC 116 may in turn couple by a standard IS-634 interface with a MSC 118, which serves to connect calls between various points in network 110. As shown, for instance, MSC 118 is interconnected by a voice/data link 120 to a network 122, which provides a path through which MSC 118 may connect calls with a remote MSC 124 and in turn with a remote station 126. Network 122 may be the PSTN or a packet-switched network such as the Internet (carrying voice over IP, for instance) or any other network or direct connection. Of course, MSC 118 may provide connectivity to other nodes in network 110 as well.

Exemplary wireless network 110 includes a signaling subsystem, which may be a packet-switched SS7 signaling system for instance. At the core of this signaling system is an STP backbone network 128, which may consist of one or more STPs and associated signaling paths. STP network 128 routes signaling messages, such as IS-41 Mobile Application Part (MAP) and ISUP call-connection messages, between various entities in network 110. In the arrangement shown, for instance, MSC 118 is coupled to the STP network by a signaling path 130. Similarly, remote MSC 124 is further coupled to STP network 128 by signaling path 132, thereby facilitating signaling communications between MSC 118 and MSC 124.

Network 110 further includes an HLR 134, which will be assumed to be the HLR for the home system of mobile station (i.e., subscriber) 112. HLR 134 could be provided on or in conjunction with an SCP or other platform for instance. Network 110 would normally include other HLRs associated with other home systems. However, the other HLRs are not shown, for clarity. HLR 134 is coupled to the STP network 128 by a signaling link 136, thereby facilitating signaling communication between HLR 134 and MSC 118 for instance.

Shown in FIG. 3 are two exemplary serving systems, serving system 138 and serving system 140. Serving system 138, for instance, comprises MSC 118 and BSC 116. In reality, serving system 138 would probably include many MSCs, but only one is shown for simplicity. In addition, serving system 138 includes a VLR 142, which maintains temporary records for subscribers in the serving zone. VLR 142 is usually part of MSC 118, but the two can instead be separate physical entities.

When a subscriber is located in a given serving system, the serving system needs to know what services the subscriber is authorized to use and who to bill for providing those services to the subscriber. To obtain this information, the subscriber's HLR will provide the serving system with a current service profile for the subscriber, which the serving system will store in its VLR for reference. The process of providing the subscriber's service profile to the serving system is part of a process called "service qualification." Service qualification can occur in various instances, including, for instance:

When a mobile station is initially detected in a serving system;

When previously obtained service qualification information for a mobile station indicates a limited duration, and the time period expires; and Whenever the subscriber's service qualification information at the HLR changes as a result of administrative or subscriber action.

By convention, service qualification may be requested by the serving system or may be autonomously initiated by the subscriber's HLR. In either case, the HLR will typically provide the serving system with a service qualification message that defines the subscriber's service profile as well as other parameters such as a time period after which the subscriber must be re-qualified. As an example, when mobile station 112 is first turned on (powered up) or enters serving system 138 (even if the serving system is the subscriber's home system), equipment in the serving system detects the mobile station (identified by its MSID and/or ESN, for instance). The serving system then determines the network address (e.g., SS7 "point code") of the subscriber's HLR 134, typically by reference to a local table (based on inter-system roaming agreements or other information). Provided with the address of HLR 134, the serving system then sends a registration notification (REGNOT) message, via link 130, STP 128 and link 136, to HLR 134, typically as payload in a TCAP message. Alternatively, if applicable, the serving system may simply send a REGNOT message to an HLR associated with the serving system, and the HLR can identify the subscriber's HLR and forward the REGNOT to that HLR.

The REGNOT message serves to notify the HLR of the subscriber's location, which is important information for the HLR, to allow the HLR to properly direct calls and other services (e.g., messages) to the subscriber. (For instance, when a serving system receives a call for a subscriber, if the serving system does not have a record for the subscriber in its VLR or if otherwise desired, the serving system might be arranged to send a location request (LOCREQ) message to the subscriber's HLR, and the HLR may then respond by providing the location of the subscriber. In turn, the serving system may set up and connect the call to the designated location.) In addition, the REGNOT message serves as a request for service qualification.

In response to a REGNOT message, the subscriber's HLR returns a registration response message (regnot) to the serving system. (Note that, by convention, initial messages or "invokes" (e.g., "REGNOT") are set forth in all caps, while response messages (e.g., "regnot") are set forth in lowercase). According to the IS-41/IS-771 standards, one of the parameters of the regnot response is the subscriber profile (or, more accurately, a profile "macro" that references a list of applicable parameters) for subscriber 112. Upon receipt of this response, serving system 138 stores the subscriber profile in VLR 142 for later reference.

As another example, upon the expiration of a previous service qualification or for any other specified reason, the serving system may ask the HLR to update the local service qualification for a subscriber. According to IS-41/IS-771, the serving system can do this by sending a QualificationRequest (QUALREQ) message to the HLR. The HLR would then respond to a QUALREQ message with a qualreq response message, that, like the regnot message, provides the serving system with information including the subscriber profile. And, again, the serving system would store the updated profile in its VLR.

As yet another example, whenever the subscriber's service profile at the HLR changes in some way that may impact the profile recorded in the serving system, IS-41/IS-771 recommends that the HLR be programmed to send an updated profile to the serving system. The HLR can do this by sending a QualificationDirective (QUALDIR) message to the serving system. Like the regnot and qualreq response messages, the QUALDIR message provides the serving system with information including the subscriber profile, which the serving system will record in its VLR.

An HLR-maintained subscriber profile may change for various reasons. For instance, an administrative action could cause a new feature to be added to the subscriber's profile or an existing subscriber feature to be activated. As will be explained below, in an exemplary embodiment of the present invention, a subscriber may dial a feature code to cause a new feature to be added to the subscriber's profile. As another example, when a text message or voice mail message is sent to a subscriber, the subscriber's HLR is notified, which may cause a flag to be set in the profile at the HLR, effectively changing the profile. As yet another example, the subscriber may activate or de-activate a particular service (such as call forwarding, for instance) by sending (e.g., dialing) a feature code; in that case, the serving system would forward the feature code to the HLR, and the HLR would update the subscriber's profile to reflect the service activation or de-activation.

According to IS-41/IS-771, the subscriber profile that the HLR provides to a serving system can optionally convey a variety of useful control information such as trigger points and other parameters to assist in call processing. As examples, and without limitation, the profile can include the following parameters:

"CallingFeaturesIndicator", which defines authorization and activity states for the subscriber's features;

"DMH_BillingDigits", which specifies the telephony billing number used for calls with special billing arrangements, to identify the party to be billed, such as third party calling for instance;

"MessageWaitingNotifcationCount", which indicates the number and type of messages currently stored in the subscriber's mailbox(es);

"DirectoryNumber", which indicates the directory number (e.g., telephone number) of the mobile station, which may be different than its MIN;

"OriginationIndication", which specifies the types of calls that the subscriber is allowed to make (e.g., no outgoing calls allowed, or local calls only, etc.);

"OriginationTriggers", which defines the origination trigger points that are currently active for the subscriber (e.g., launch an OriginationRequest query in response to any call (i.e., all-digits origination trigger), or in response to any local call, any call placed to a particular number, any long distance call, or any call involving dialed digits beginning with a character such as "*" or "#", for instance);

"SMS_OriginationRestrictions" and "SMS_TerminationRestrictions", which define the type of short text messages that the subscriber is allowed to send or receive;

"SPINIPIN" and "SPINITriggers", which indicate a personal identification number (PIN) and call processing trigger points at which the serving system must require input of the PIN before allowing call originations from the mobile station; and "TerminationTriggers", which defines the termination trigger points that are currently active for the subscriber (e.g., launch a RedirectionRequest query in response to a busy, no answer or not reachable condition, for instance).

In addition, according to IS-771 for example, the subscriber profile can include a "TriggerAddressList" parameter, which is used to provide the serving system with lists of triggers and, for each list, an associated address (e.g., point code) of a network entity that provides the service control function for the triggers in the list. The triggers are referred to in IS-771 parlance as "WIN_Triggers." The idea here is that the profile may specify that the serving system should query any designated central control point in the network (e.g., an HLR, an SCP, an intelligent peripheral (IP), or a service node (SN)) for guidance at a predefined trigger point during call processing.

Accordingly, to facilitate additional WIN services, network 110 may further include a central control point, which is depicted for purposes of example as SCP 144. SCP 144, which is coupled by a signaling path 146 with the STP network 128, may be a Telcordia SCP (e.g., an integrated SCP or ISCP). SCP 144 can thus serve conventional IN features such as providing routing instructions to MSC 118. SCP 144 is typically owned and operated by a local or long distance carrier. Further, although SCP 144 is shown separate from HLR 134, it is possible that the two may be one combined entity, such as one computer system operating two separate functional processes. In the exemplary embodiment, messages can be passed between such separate processes, even if only as arguments of function calls.

As additionally illustrated in FIG. 3, network 110 also includes a provisioning system 148. Provisioning system 148 is shown coupled by a signaling link 150 with HLR 134 and by a signaling link 152 to SCP 144. Provisioning system 148 may operate to load service profile information for various subscribers or groups of subscribers into HLR 134 and to load enhanced service logic for various subscribers or groups of subscribers into SCP 144. This logic may be logic that causes the profile modification in response to dialed digits and/or it could be associated logic to provide one or more services for the subscriber. In addition, provisioning system 148 may allow authorized individuals or entities to view the current parameters and settings recorded in the HLR 134 and SCP 144. Although FIG. 3 shows provisioning system 148 as a single entity serving both HLR 134 and SCP 144, separate provisioning systems and one or more entities may be provided instead.

In the existing art, if a subscriber wishes to have access to or remove access from a special set of services (e.g., subscribe to or unsubscribe from), the subscriber must contact the customer care department of the subscriber's service provider (e.g., carrier) by calling an operator or interacting with an automated customer care system (such as an online management web site). The customer care department may then input authorized service logic into a database, the changes would be converted into the necessary format and a provisioning system may then load this information into the subscriber's HLR profile and possibly load enhanced service logic information for the subscriber into an SCP. To the extent any of the added service logic requires modification of the subscriber's VLR profile, a script programmed in the HLR would then cause the VLR to send a QUALDIR message to the subscriber's serving system, if any, and the serving system would store the updated profile in its VLR for later reference.

Methods of Provisioning Authorization for use of a Service

According to one embodiment of the present invention, a subscriber may subscribe to or unsubscribe from services as the subscriber desires by sending a message to the serving system, rather than (or in addition to) contacting the customer care department of the subscriber's serving system. The message may be communicated to an HLR and/or SCP of the network, which may responsively provision authorization for use of the desired services by modifying the subscriber's profile. The message includes a user input character or string of characters from a typical telephone keypad. For example, the message may include any alphanumeric character such as numerals 1–9, or additional characters such as "#" and "*," and may be any length.

As an example, the subscriber may dial a feature code to subscribe to or unsubscribe from a service rather than (or in addition to) activating, deactivating, or modifying services within a telecommunications network. As mentioned above, a business (e.g., service provider) may establish feature codes by programming an entity of the communication system to recognize such a code. According to the exemplary embodiment, specific feature codes, feature code headers, or feature code footers may be established to correspond to a subscription preference, such as subscribing to or unsubscribing from the service. For example, a feature code of "222" may correspond to a call-forwarding service. And a feature code header, such as "*", may indicate that a subscriber wishes to subscribe to a service. Therefore, if a subscriber dials "*222", the network will authorize use of the call-forwarding service for the subscriber. Similarly, a separate feature code header, such as "#", may be established for unsubscribing from services so that if a subscriber dials "#222", then network will then prohibit use of the call-forwarding service by the subscriber.

Note that any string of alpha-numeric characters may comprise a feature code. In addition, in instances where the feature code itself indicates the subscription preference (i.e., subscription to or unsubscription from a service), feature code headers or footers may be omitted.

Figure 4:
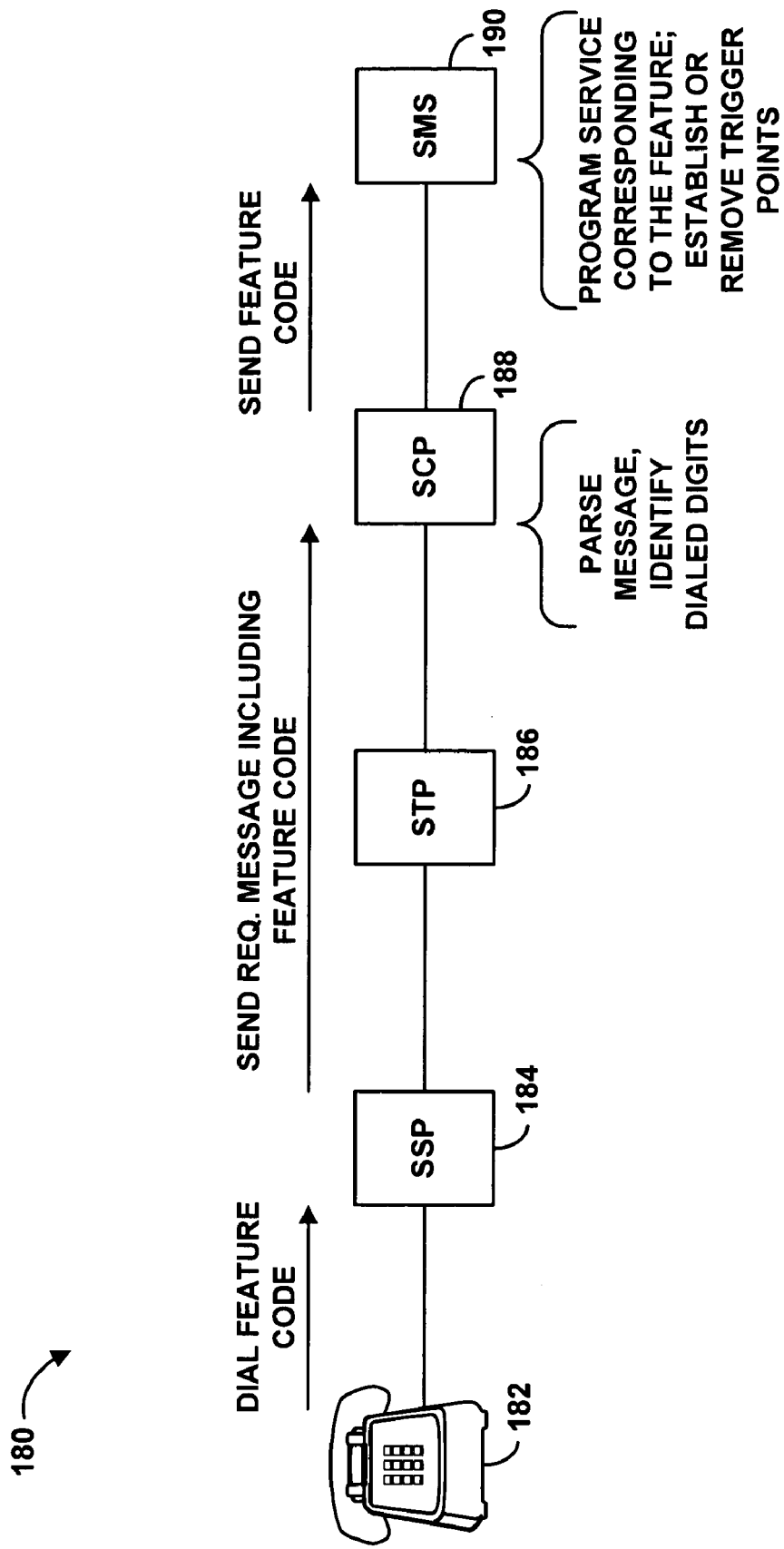
FIGS. 4 and 5 are block diagrams illustrating signaling within a landline and a wireless network in accordance with an exemplary embodiment of the present invention.

Referring to FIG. 4, a portion of a landline network 180 is illustrated. When the subscriber dials a feature code on a landline device 182, entities of the network 180 send a series of messages to each other. An SSP 184 may receive the dialed feature code from the landline device 182. The SSP 184 may send a request message including the feature code through an STP 186 to a SCP 188, which in turn may send the feature code to an SMS 190.

When the SCP 188 receives the request message from the SSP 184, the SCP 188 will parse the message and identify the subscriber and the dialed digits. Recognizing that the dialed digits correspond to a feature code of a particular type (i.e., such as a feature code to subscribe to or unsubscribe from a particular service), the SCP 188 will then modify the subscriber's profile within the SCP 188 and send a message including the feature code (and/or profile change) to the SMS 190 (or ASMS). Logic within the SMS 190 may then determine that the subscriber is asking to subscribe to a specific service or requesting to unsubscribe from the service. In this regard, the SMS 190 may have a lookup table to correlate the feature codes with offered services and to correlate the feature codes with an authorization preference (i.e., subscribe to or unsubscribe from a service) of the subscriber. Table 1 illustrates an example look-up table.

TABLE 1

| Service | Feature Code/Subscribe | Feature Code/Unsubscribe |
|---|---|---|
| Call-Forwarding | 987654 | *987654 |
| Call-Screening | 014254 | *014254 |
| Abbreviated Dialing | 254689 | *254689 |

As illustrated in Table 1, a subscriber may dial "987654" to subscribe to the call-forwarding service, i.e., to obtain authorization to use the call-forwarding service. And the subscriber may dial "*987654" to then unsubscribe from the call-forwarding service, i.e., to be prohibited from using the call-forwarding service. In turn, the SMS 190 may establish appropriate trigger points or remove existing trigger points within the subscriber's profile according to the dialed feature code.

Figure 5:
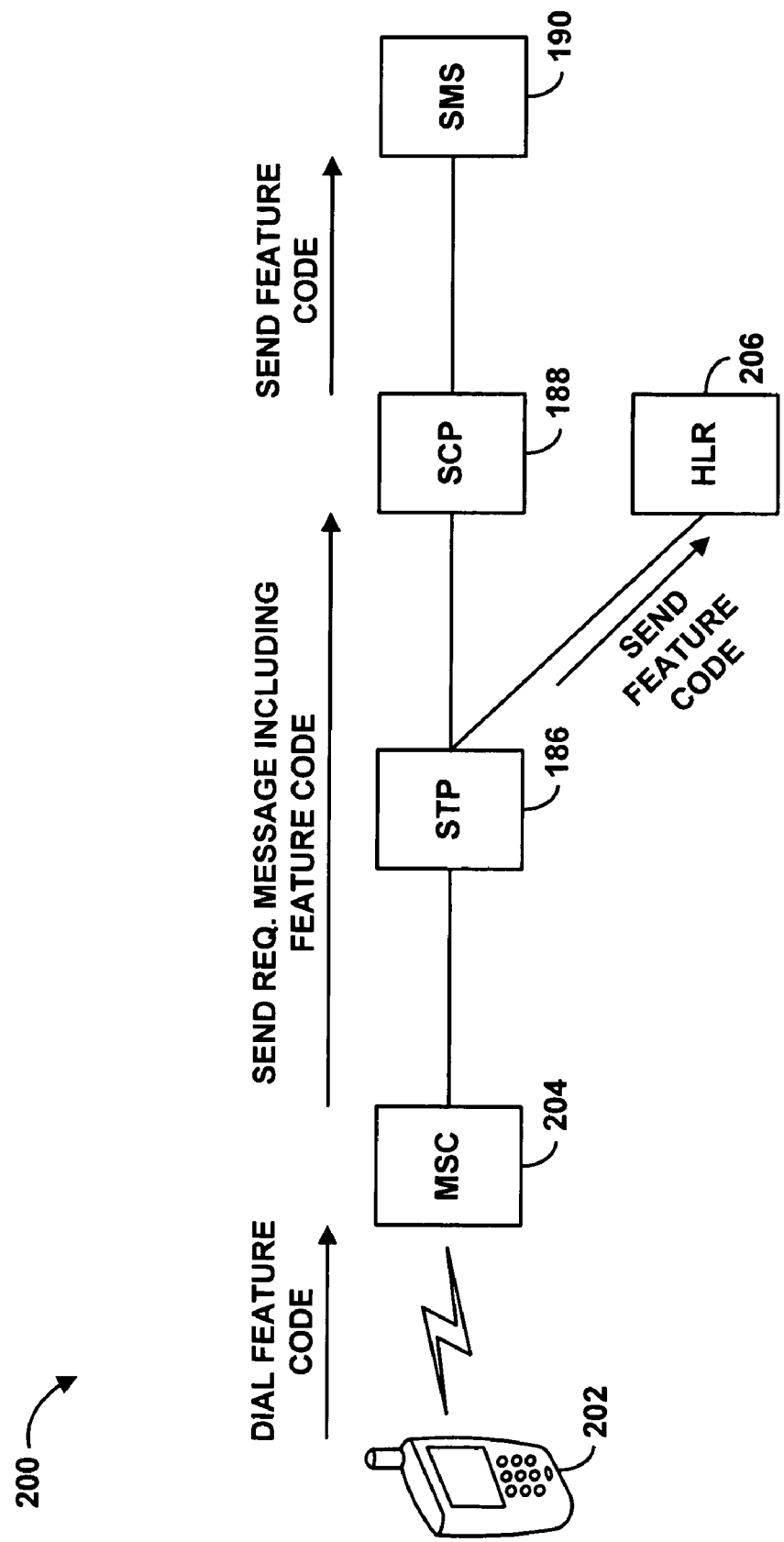

FIG. 5 is a block diagram illustrating signaling within a portion of a wireless network 200. Signaling within the wireless network 200 may be similar to that within the landline network 180. A user of a wireless device 202 may dial a feature code, and an MSC 204 may receive the dialed feature code. The MSC 204 may send a request message including the feature code through the STP 186 to the SCP 188, which in turn may send the feature code to the SMS 190. (The STP 186, SCP 188 and SMS 190 may be the same entities within both the landline network 180 and the wireless network 200 since each network 180, 200 simply represents a portion of a serving system within a telecommunications network, similar to serving systems 32 and 36 illustrated in FIG. 2). For example, a request message may be a Feature Request message as defined in Interim Standard 41 (IS-41), published by the Telecommunication Industry Association and herein incorporated by reference. After sending the feature code to the SCP 188, the MSC 204 may send the feature code to an HLR 206. Either the HLR 206 or the SCP 188 may responsively update the subscriber's profile to reflect the changes as requested by the subscriber. The SCP 188 or the HLR 206 may receive the request message from the MSC 204, parse the message, identify the subscriber and the dialed digits, and modify the subscriber's profile accordingly.

In addition, the HLR 206 (or SCP 188) may forward the feature code to the SMS 190, which would then cause changes to be made at the HLR 206 (or SCP 188). The feature code may be forwarded in a customer originated recent change (CORC) message from the HLR 206 to the SMS 190. The SMS 190 would then provision the service back within the HLR 206.

The subscriber's profile may be modified due to a dialed feature code in other ways as well. For example, the SCP 188 may indirectly effect a change of the subscriber profile by modifying the HLR record for the subscriber, which will cause the HLR 206 to send the changed profile to the serving system (i.e., possibly to the MSC 204). Also, the SCP 188 may directly effect a change of the subscriber profile by sending to the serving system a service qualification message including the modified profile. In either case, the serving system would receive a modified subscriber profile and record it in its VLR for example, for later reference.

In one embodiment, the SCP 188 may modify the subscriber's profile in the HLR 206, which will in turn cause the HLR 206 to send a QUALDIR with the modified profile to the serving system. In this arrangement, the SCP 188 may query the HLR 206 with an IS-41 SEARCH invoke, to determine parameters of the subscriber's current profile. The SCP 188 may then direct the HLR 206 to modify desired profile parameters, using an IS-41 MODIFY invoke. In turn, because the HLR profile for the subscriber has been modified, the HLR 206 would automatically send a service qualification message to subscriber's serving system, providing a refreshed VLR profile that contains the parameters as modified by the SCP 188.

In another embodiment, the SCP 188 can directly modify a subscriber's profile within the HLR (or VLR) profile by sending a QUALDIR invoke message to the serving system, and thereby providing the serving system with a desired modified profile. If the SCP 188 does not already know what the subscriber's profile contains, the SCP 188 may first send a SEARCH invoke message to the HLR 206, requesting the subscriber's profile. The HLR 206 would respond with the requested profile information. The SCP 188 may then modify parameters of the profile and then itself send a QUALDIR to the serving system, providing the modified profile for storage in the VLR. Of course, intervening elements may be present as well. Further, to the extent possible, the SCP 188 might instead send only one or more parameters to the serving system, in order to modify just a part of the subscriber profile without sending an entire modified profile to the serving system.

Example Modifications of a Subscriber Profile

In accordance with an exemplary embodiment, once SCP 188 receives a dialed feature code, the SCP 188 will effect a modification of the service profile for the subscriber (i.e., provision in the subscriber profile to indicate that the subscriber is entitled to invoke the service, or to indicate that the subscriber is not entitled to invoke the service), by employing the methods described above, for instance. This modification of the service profile may take any form. However, an exemplary modification comprises adding or modifying one or more triggers or trigger-addresses (collectively or separately referred to as a "trigger") in the subscriber's profile to subscribe to or unsubscribe from a service, causing the serving system to send a message to or otherwise communicate with a designated network entity in response to a call processing event (such as origination or termination) or other occurrence. Additionally, another modification may involve changing an existing data field in the subscriber's profile, e.g., to authorize use of call waiting.

In the exemplary embodiment, the designated entity is arranged to carry out a set of service logic associated with the subscriber in response to a message sent pursuant to a trigger. For example, the entity could be an SCP programmed to provide special services for the individual subscriber or for a group of subscribers in response to an origination request associated with the subscriber or group of subscribers. This SCP could be the same entity that effects the modification of the subscriber profile, or it could be a different entity. As another example, the entity could be a private service node that will provide enhanced services for the subscriber and others. The private service node may, for instance, be operated by or otherwise associated with a business (such as a hotel), so as to provide special communications services for customers of the business (such as hotel guests). For instance, the service node might provide custom announcements or PBX services.

As a general example of modifying a service profile, assume that the service profile for a subscriber normally includes one or more trigger-addresses that direct the serving system to query the HLR in response to a call processing event. The SCP 188 may modify these trigger-addresses to instead direct the serving system to query the SCP 188 in response to an origination or termination attempt. When call processing control is passed to the SCP 188, the SCP 188 can then apply any programmed set of service logic for the subscriber, which may be different from the services that would be provided to the subscriber by the HLR or pursuant to the subscriber's profile.

For instance, in typical operation as noted above, a subscriber may subscribe to or unsubscribe from a particular service by sending a feature code, which the serving system would normally forward to the HLR 206 to update the subscriber's profile. The SCP 188 can modify the subscriber profile to add to the subscriber profile an all-digits trigger that points to the SCP.

Such a trigger would cause the serving system to respond to any dialed digits, even a feature code, by sending a TCAP query to the SCP 188. The TCAP query would convey to the SCP 188 an identification of the subscriber (e.g., MSID, ESN or other subscriber number) as well as the digits dialed by the subscriber. SCP 188 logic would responsively call up the subscriber record from a database, which may point to specified service logic. The service logic may then examine the feature code and take appropriate action.

When a subscriber dials a feature code to subscribe to or unsubscribe from a service, the subscriber's profile will be modified accordingly, to add the service (or the right to invoke the service) or take away the service (or the right to invoke the service). For instance, if the subscriber is adding a new service to his/her service provider account, then a new record will be created in the subscriber's profile indicating the new service. And, if the subscriber is unsubscribing from a service or removing a service from his/her account, then the record corresponding to the indicated service will be removed from the subscriber's profile.

More specifically, each subscriber may have a profile maintained in a table format, such as Table 2 shown below, and upon subscription to or unsubscription from a service, the table is updated accordingly. The table format below is one example, since a subscriber's profile may contain more or fewer data fields.

TABLE 2

| Name | Call-Forwarding (CF) Subscribe | CF Activate | CF Feature Code |
| --- | --- | --- | --- |
| John Doe | ☐ | ☐ | 987654 |
| Amy Public | ☒ | ☒ | 987654 |
| Joe Citizen | ☒ | ☐ | 987654 |

As illustrated, a subscriber, John Doe, does not subscribe to call-forwarding, and consequently he does not have authorization to activate or deactivate call-forwarding. Amy Public subscribes to call-forwarding and thus may be authorized to use that service. Amy Public may have dialed the feature code, 987654, to subscribe to call-forwarding. Amy Public also has activated the call-forwarding service (as indicated by the "X" in the box for CF activate), so the service will apply to forward calls placed to her. On the other hand, Joe Citizen subscribes to call-forwarding, possibly by dialing the feature code, but he does not have this service activated because he may not wish to have his calls forwarded at this time, so calls to Joe Citizen will not be forwarded.

As an example, assume that a subscriber wishes to subscribe to a voice mail service. The subscriber may dial an appropriate feature code and send it to the serving station (e.g., by pressing SEND on a mobile station). The serving system would responsively send that feature code to the HLR 206, which would cause the HLR 206 to authorize the subscriber for use of the voice mail service by recording in the subscriber's profile that unanswered calls should be forwarded to the service provider's standard voice message system. (Also, the SMS 190 may send data to a voicemail server to provision the user into the voicemail system). In turn, when an unanswered call arrives for the subscriber, the serving system might encounter a termination trigger, which would cause the serving system to query the HLR 206 for routing instructions, and the HLR 206 would direct the serving system to route the unanswered call to the standard voice message system.

When the subscriber sends the feature code to subscribe to voice mail, the serving system may also send the feature code to the SCP 188 in a TCAP query. Upon receipt of the feature code, a record for the subscriber in the SCP 188 may then be changed to reflect that unanswered calls to the subscriber should be routed to the special voice message system. Such code might be programmed into service logic of the SCP 188 for instance.

In turn, when a call arrives for the subscriber and is unanswered, the serving system would send a TCAP query to the SCP 188. The SCP 188 may then instruct the serving system in a TCAP response to route the call to the special voice message system, such as an IP and/or an interactive voice recognition unit (IVRU). The special voice message system may then answer with an outgoing message such as "Thank you for calling business XYZ; please leave a message for person A."

When the subscriber sends the feature code to subscribe/unsubscribe to a service, updated billing information in the subscriber's profile may also be established according to the services indicated by feature codes. As an example, the feature codes may include billing indicators, which are established to correspond to billing information of a specific service. Alternatively, a lookup table may be used to determine billing information corresponding to the specific service. The SCP 188, HLR 206 or SMS 190 may thus determine the updated billing information from the billing indicators or the lookup table and then update the subscriber's profile to reflect the billing information indicated within the lookup table.

Using features codes to subscribe to or unsubscribe from services enables the subscriber to independently choose when to subscribe to or unsubscribe from services. In this manner, the addition or removal of a service from the subscriber's profile may take effect more directly in response to instructions from the subscriber and more quickly due to automatic provisioning of services rather than manual provisioning of the services.

Exemplary embodiments of the present invention have been illustrated and described. It will be understood, however, that changes and modifications may be made to the invention without deviating from the spirit and scope of the invention, as defined by the following claims. For instance, as noted above, the invention can be implemented in various types of network arrangements (e.g., landline, wireless, next generation, etc.), and/or across network platforms. Other examples are possible as well.

We claim:

1. In a communications network comprising an entity maintaining a subscriber profile for at least one subscriber, a method comprising:
    Receiving from a user a message indicative of a service provided by the communications network; and
    Based on the message, responsively performing an action selected from the group consisting of (i) provisioning the subscriber profile to indicate that the at least one subscriber is entitled to invoke the service and (ii) provisioning the subscriber profile to indicate that the at least one subscriber is not entitled to invoke the service,
    Wherein provisioning the subscriber profile to indicate that the at least one subscriber is entitled to invoke the service includes adding in the subscriber profile a new record that designates the service, and
    Wherein provisioning the subscriber profile to indicate that the at least on subscriber is not entitled to the service includes identifying from the message the at least one subscriber and a set of dialed digits, recognizing that the set of dialed digits correspond to the service, and modifying parameters of the subscriber profile to indicate that the at least one subscriber is not entitled to invoke the service by modifying a set of service logic so that the set of service logic is not operable to carry out the service indicated by the message.

2. The method of claim 1, wherein the message comprises a feature code.

3. The method of claim 2, wherein the feature code comprises at least one alphanumeric character.

4. The method of claim 2, wherein the feature code comprises a set of dialed digits.

5. The method of claim 4, wherein provisioning the subscriber profile to indicate that the at least one subscriber is entitled to invoke the service comprises:
    identifying from the message the at least one subscriber and the set of dialed digits,
    recognizing that the set of dialed digits correspond to the service; and
    modifying parameters of the subscriber profile to indicate that the at least one subscriber is entitled to invoke the service.

6. The method of claim 5, wherein modifying parameters of the subscriber profile to indicate that the at least one subscriber is entitled to invoke the service comprises modifying a set of service logic to be operable to carry out the service indicated by the message.

7. The method of claim 5, wherein the subscriber profile is maintained in a table format, and wherein modifying parameters of the subscriber profile to indicate that the at least one subscriber is entitled to invoke the service comprises modifying the table to indicate that the at least one subscriber is authorized to invoke the service.

8. The method of claim 7, wherein the subscriber profile is maintained in a table format, and wherein modifying parameters of the subscriber profile to indicate that the at least one subscriber is not entitled to invoke the service comprises modifying the table to indicate that the at least one subscriber is not authorized to invoke the service.

9. The method of claim 1,
    wherein provisioning the subscriber profile to indicate that the subscriber is entitled to invoke the service comprises establishing in the subscriber profile a trigger point corresponding to the service, and
    wherein provisioning the subscriber profile to indicate that the subscriber is not entitled to invoke the service comprises removing from the subscriber profile the trigger point corresponding to the service.

10. The method of claim 1,
    wherein provisioning the subscriber profile to indicate that the subscriber is entitled to invoke the service and provisioning the subscriber profile to indicate that the subscriber is not entitled to invoke the service comprises modifying existing data fields in the subscriber profile.

11. The method of claim 1, further comprising selecting the action based on the message.

12. The method of claim 11, wherein selecting the action based on the message comprises identifying a feature code header from the message, wherein the feature code header is indicative of the action to be performed.

13. The method of claim 11, wherein selecting the action based on the message comprises using a look-up table to correlate the message with the action.

14. The method of claim 1, further comprising determining the service indicated by the message by using a lookup table to correlate the message with the service.

15. The method of claim 1, wherein receiving the message indicative of the service provided by the communications network comprises receiving the message from a communications device operated by the at least one subscriber.

16. The method of claim 1, wherein provisioning the subscriber profile to indicate that the at least one subscriber is entitled to invoke the service includes adding in the subscriber profile a new record that designates the service.

17. In a telecommunications network comprising at least one network entity maintaining a subscriber profile for at least one subscriber, a system for provisioning authorization for use of a service by the at least one subscriber comprising:

A switch operable to receive a message from a telecommunications device operated by the at least one subscriber; and A central control point in a communication with the switch, the central control point being operable to receive the message from the switch and to determine that the message contains a feature code, the feature code being indicative of the service, Wherein the central control point sends a request message comprising the feature code to the at least one network entity, and based on the feature code, the request message causes logic within the at least one network entity to provision in the subscriber profile authorization for use of the service by the at least one subscriber by adding in the subscriber profile a new record that designates the service or to provision in the subscriber profile to indicate that the at least one subscriber is not entitled to invoke the service by modifying parameters of the subscriber profile and wherein the central control point is selected from the group consisting of a service control point (SCP), a home location register (HLR), an application server, a mobile Internet protocol (MIP) home agent, and a computer telephony interface (CTI).

18. The system of claim 17, wherein the at least one network entity parses the request message to identify the feature code and to identify the at least one subscriber.

19. The system of claim 17, wherein the at least one network entity maintaining the subscriber profile for the at least one subscriber is selected from the group consisting of a service management system (SMS), a home location register (HLR), and a mobile switching center (MSC).

20. The system of claim 17, wherein the switch is selected from the group consisting of a service switching point (SSP) and a mobile switching center (MSC).

21. The system of claim 17, wherein the central control point is in communication with the switch via a signaling transfer point (STP).

22. The system of claim 17, wherein the at least one network entity provisions in the subscriber profile authorization for use of the service by performing an action selected from the group consisting of provisioning the subscriber profile to indicate that the at least one subscriber is entitled to invoke the service and provisioning the subscriber profile to indicate that the at least one subscriber is not entitled to invoke the service.

23. The system of claim 17, wherein the request message causes logic within the at least one network entity to provision in the subscriber profile authorization for use of the service by the at least one subscriber by adding in the subscriber profile a new record that designates the service.

* * * * *